J. F. JABLONSKI.
DOUBLE TREAD TIRE.
APPLICATION FILED SEPT. 20, 1915.
1,209,442.
Patented Dec. 19, 1916.
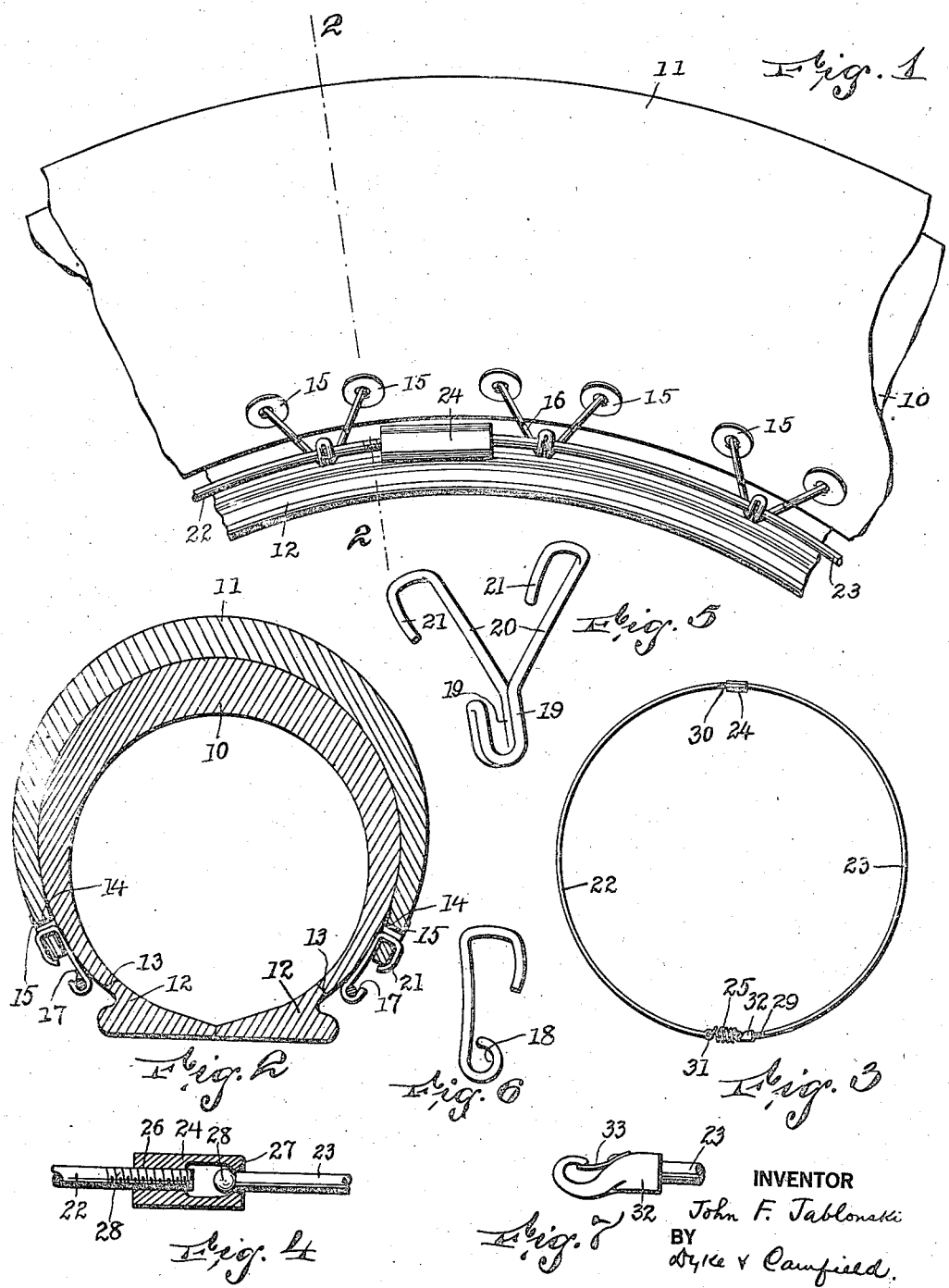
INVENTOR
John F. Jablonski
BY
Dyke & Canfield
ATTORNEYS

UNITED STATES PATENT OFFICE.

JOHN F. JABLONSKI, OF IRVINGTON, NEW JERSEY.

DOUBLE-TREAD TIRE.

1,209,442.   Specification of Letters Patent.   Patented Dec. 19, 1916.

Application filed September 20, 1915. Serial No. 51,554.

*To all whom it may concern:*

Be it known that I, JOHN F. JABLONSKI, a citizen of the United States, and a resident of Irvington, county of Essex, and State of New Jersey, have invented certain new and useful Improvements in Double-Tread Tires, of which the following is a specification.

My invention relates to tires, and particularly to improvements in the securing of a reinforcing cover or tread portion upon pneumatic automobile tires.

Double tread tires, as they have come to be known, have been constructed, as far as I am aware, by sewing or cementing upon one casing a second similar casing having the bead portion thereof first cut away so as to provide a new tread portion and at the same time so as not to interfere with the securing of the under casing in place upon the wheel rim. The stitching of a casing with the bead cut off upon a tire casing containing an inner pneumatic tube has many defective features, for example, the heavy thread or cord, which must be used, where it projects on the inside of the inner casing makes a rough line which chafes the inner tube and produces leaks therein, and this effect is very much heightened where there are any patches or irregularities of any sort in the tube. For this reason it is well understood that with double tread tires having their parts secured together by stitching, it is not practicable to use any other than new and heavy inner tubes, which, of course, is an item of considerable added expense. Furthermore, the stitching rots and breaks out rapidly, and the fastening of the outer tire soon becomes insecure, and a frayed and unsightly appearance is presented, and ultimately the outer or covering tire is loosened altogether and may come off entirely or may slip on the inner casing, producing friction and heat and thus ruining not only the outer shoe, but the shoe inside which was intended to be preserved and given longer life.

According to the present invention the outer covering, which is preferably a tire casing with the bead portion removed, is provided with a series of metallic hooks around its innermost edges, and a ring, which may be shortened and drawn tight, is passed through the eyes of the hooks and tightened up, thereby securing the reinforcing tread portion securely in place, and when such reinforcing tread portion becomes worn, it may readily be removed by loosening the ring and taking off the worn tread portion and substituting a new or different one therefor. The reinforcing covering being secured in this manner with hooks and draw rings on each side, there is no fastening which extends through the inner casing and nothing to chafe the inner tube which retains the air and the pressure for holding the tire casing extended. Such fastening devices are readily applied by any one whenever desired, and there is no need for the heavy machinery which is requisite for the heavy sewing operation of sewing through the heavy carcasses of two tire casings, as is necessary when stitching is resorted to for holding the casings together. A motorist having a small package of hooks and members for making up the rings can make the attachment in a very short time and at practically no expense, and it becomes possible for motorists to make effective reuse of worn casings and to cut down their tire bill very materially.

With the foregoing and related objects in view, my invention consists in the parts, combinations and improvements herein set forth and claimed.

For the purpose of giving an understanding and clear disclosure of my invention, I have shown in the accompanying drawing an embodiment thereof, but it is to be understood that the same is for illustration only.

In the said drawing forming a part of this specification, and wherein the same reference numerals are applied to uniformly designate the same parts throughout, Figure 1 is a fragmentary side view showing a portion of a tire with the tread covering held in place in accordance with one form of my invention. Fig. 2 is a cross-sectional view taken on the line 2—2, Fig. 1. Fig. 3 is a face view of one form of complete holding ring in accordance with my invention. Fig. 4 is a fragmentary view partly in cross-section and showing the preferred form of turnbuckle. Fig. 5 is an elevational view of a hook for attachment to a tire covering. Fig. 6 is a side view of such a hook showing the eye in closed position, and Fig. 7 is an enlarged side view of a snap hook for engaging a loop in the end of a spring.

Reference numeral 10 is applied to designate the tire casing which is to be reinforced.

11 designates the reinforcing or covering member which, in the form shown, consists of a tire casing similar to the casing 10 but having the bead portion thereof cut off or removed. As will be understood, such bead portions, before they were cut off, resembled the bead portions 12, 12 of the casing 10, and it will also be understood that if at a later time the casing 10 is itself to be used as a reinforcing cover, the bead portions 12, 12 will be similarly cut off, as indicated by the dotted lines 13, 13.

A series of hook members are secured to the covering member 11, and this is preferably accomplished by punching holes 14 therein near the edges thereof. These holes 14 are preferably arranged in pairs about as shown, in order to enable the use of the particular form of hook member which I prefer to use. Preferably in the holes 14 are placed eyelets 15 similar to those used in shoe uppers, and such eyelets when present give increased wear and reduce the liability of the hooks tearing out in a manner which will be understood. The eyelets may be dispensed with, however, if desired. The hook members, which are formed of wire of any convenient cross-section, round wire being illustrated in the present showing, are designated by the reference numeral 16. These hook members are formed by first bending a piece of wire of the proper length—about four to six inches—upon itself at the middle. This provides two strands of wire joined together at one end and with the remaining ends free. The end where the strands are joined together is turned back on itself to form an eye 17, and such eye may be partly open, as shown in Figs. 2 and 5, or substantially closed, as shown at 18 in Fig. 6. The two strands are separated so as to diverge at an angle to one another, and they may diverge at the back of the eye, as shown in Fig. 1, or they may extend for a distance substantially parallel, as shown at 19, 19, Fig. 5, and then diverge as shown at 20, 20 on this figure. The angle at which they diverge may be varied in practice, but I prefer to form the angle about as shown, thus providing two diverging free ends of the wire which may be secured to the casing at separated points. The two divergent strands are bent over to form the hooks 21, 21, and these hooks are inserted through the openings 14, 14 in the covering member provided for that purpose, and these hooks are thereafter preferably closed, as shown, (Fig. 2) this being accomplished as by means of a pair of pliers and in a manner which will be readily understood.

The doubled ends of the hook members 16 may not have a complete eye formed therein, but may be merely bent back in the form of an open hook 17, as shown in Figs. 2 and 5, in which case the ring holding member can be slid directly into the open hooks in a manner which will be obvious. I prefer, however, to form the hook members with eyes 18 by bending the doubled ends thereof completely over or substantially so, and with such arrangement it is requisite that the members forming the rings may be of such construction that they may be passed through the eyes 18 in the hooks 16. I have shown a form of ring member in which this result may be readily secured, and, while a larger number of sections may be used if desired, the same, as shown, consists principally of two substantially semi-circular sections of rod or wire 22, 23 which are secured together by means of a turnbuckle 24 and have a spring 25 interposed between them substantially opposite the turnbuckle 24. The turnbuckle may be of the ordinary form, but I prefer to use the construction illustrated, in which the turnbuckle is provided at one end with a threaded bore 26 and at the opposite end is closed except for a reduced axial opening 27. The ring member 23 has a head 28, and the same may be inserted through the threaded opening 26 and the opening 27, except that the head 28 can not pass through the opening 27 in the unthreaded end of the turnbuckle. This ring member 23 is preferably provided with a screw-thread 29 at the end opposite the head 28 for a purpose presently to be described. The remaining ring member 22 has a screw-thread 30 on one end designed to enter and be screwed into the threaded opening 26 in the turnbuckle, and on its opposite end is provided with means for securing it to the spring, as a loop 31.

The threaded end 29 of the ring member 23 is provided with means for securing the same to the spring 25, and the same may consist of a hook 32 having a threaded aperture by which it may be screwed on to the threaded end 29 of the ring member 23, and this may take the form of a snap hook, as shown in Fig. 7, a leaf spring 33 being provided for preventing the spring from accidentally becoming disengaged, though this snap hook feature is not essential.

From the foregoing description the manner of using improved fastening members in accordance with my invention for making up double tread tires will be readily understood. The covering member being at hand and ordinarily consisting of a discarded casing with the bead removed, the openings 14 are provided in such covering member and the hooks secured therein, the openings being preferably lined with eyelets 15. With the open form of hook shown in Figs. 2 and 5 any form of ring member for being received within the hooks and thereby holding the covering member in place may be made use of. Where the hooks are provided with the closed eyes 16, however, ring members which may pass longitudinally through said eyes are necessary to be provided, and the form of ring illustrated affords a construction with which this may be accomplished. The section 23 with the screw-threaded end 29 in advance may be passed through the eyes in substantially half of the hooks, it being understood that this ring member is passed through the turnbuckle before being passed through any of the hooks. The remaining member 22 is passed through the eyes in the remaining hooks with the screw-threaded end 30 in advance, and when the turnbuckle and the eyes have been properly strung on the ring members, the hook 32 may be secured on the threaded end of the member 23, and this in turn secured to the spring 25, which at its opposite end is secured to the loop 31 on the ring member 23, whereupon the threaded end of the turnbuckle may be screwed on the threaded end 30 of the ring member 22 and will serve to tighten the ring and to draw the hooks up securely and hold the covering member tightly and securely in place. By the provision of the spring 25, the holding action thus secured is not absolutely rigid, but it becomes possible for the ring to give slightly to prevent the tearing out of the hooks 16, as may happen if such spring were not provided in the fastening ring.

It will be understood that the arrangement on each side of the casing is preferably alike, and that a double set of hooks and rings is preferably provided, one for one side and the other for the other side of each tire to which a reinforcing covering is to be secured. I may, however make use of the improvements which I have described on a single side of the casing only. As will be evident, it is not necessary to remove the tire from the wheel in order to apply a reinforcing tread member in accordance with my invention. Preferably when this is done the casing to be reinforced is deflated at least partially and is again inflated after the reinforcing tread is applied, the presence of the spring 25 being of advantage in such connection. It is, however, more convenient ordinarily to remove the tire from the wheel before applying the reinforcing tread covering.

While I have illustrated certain forms in which my invention may be embodied, it is to be understood that the same are for the purpose of affording a clear understanding of my invention, and that the invention is not confined to such specific form or forms except as specified by my claim, and that a number of departures therefrom and modifications therein may be resorted to within the scope of said claim and without departing from or sacrificing the advantages of my invention.

Having thus described my invention, I claim:

A continuous tread covering for a tire provided about its margin with a series of apertures arranged in pairs, a series of hooks comprising hooked arms diverging from one another and an intermediate eye, each of said hooks having its arms hooked through the body of the tire covering in a pair of said apertures, a ring extending through the eyes, and means for making the ring tight, substantially as set forth.

In testimony that I claim the foregoing I hereto set my hand, this 16th day of September, 1915.

JOHN F. JABLONSKI.